United States Patent
Nakayama

(10) Patent No.: US 6,675,186 B1
(45) Date of Patent: Jan. 6, 2004

(54) DECIBEL ADJUSTMENT DEVICE WITH SHIFT AMOUNT CONTROL CIRCUIT

(75) Inventor: Masahiko Nakayama, Tokyo (JP)

(73) Assignee: NEC Corporation, Tokyo (JP)

( * ) Notice: Subject to any disclaimer, the term of this patent is extended or adjusted under 35 U.S.C. 154(b) by 674 days.

(21) Appl. No.: 09/603,779

(22) Filed: Jun. 26, 2000

(30) Foreign Application Priority Data

Jun. 25, 1999 (JP) .......................................... 11-180616

(51) Int. Cl.⁷ .................................................. G06F 7/52
(52) U.S. Cl. ................................................... 708/620
(58) Field of Search ................................ 708/620, 624, 708/623, 625, 627, 628; 348/646; 381/104

(56) References Cited

U.S. PATENT DOCUMENTS

| | | | |
|---|---|---|---|
| 4,031,377 A | | 6/1977 | Deutsch et al. |
| 4,181,970 A | * | 1/1980 | Izumi et al. ................ 708/628 |
| 4,482,916 A | * | 11/1984 | Acampora .................. 348/646 |
| 4,566,076 A | * | 1/1986 | van der Steen ............. 708/625 |
| 4,731,851 A | * | 3/1988 | Christopher ................ 381/104 |
| 5,402,369 A | | 3/1995 | Main |

FOREIGN PATENT DOCUMENTS

| | | |
|---|---|---|
| JP | 566747 | 3/1993 |
| JP | 5224891 | 3/1993 |
| JP | 619686 | 1/1994 |
| JP | 6103033 | 4/1994 |
| JP | 2708979 | 10/1997 |
| WO | 88/08567 | 11/1988 |

OTHER PUBLICATIONS

U.K. Search Report issued Feb. 20, 2001 in a related application (in English).

* cited by examiner

Primary Examiner—Chuong Dinh Ngo
(74) Attorney, Agent, or Firm—Dickstein, Shapiro, Morin & Oshinsky, LLP.

(57) ABSTRACT

A decibel level adjustment device that calculates an output signal that is a d decibel multiple of an input signal comprises a plurality of shift circuits, a shift amount control circuit, and adders. The shift circuits shift an input signal by exactly a designated number of bits in a designated direction. The shift amount control circuit receives the value of d as a decibel control value, and in accordance with this decibel control value, generates and outputs control signals that indicate the number of bits to shift and the shift direction of each shift circuit. The adder adds the outputs of the shift circuits.

4 Claims, 5 Drawing Sheets

DECIBEL ADJUSTMENT DEVICE WITH SHIFT AMOUNT CONTROL CIRCUIT

BACKGROUND OF THE INVENTION

1. Field of the Invention

The present invention relates to a decibel level adjustment device for calculating an output signal that is a decibel multiple of an input signal.

2. Description of the Related Art

In electronics, dB (decibels) are used as the unit for various characteristics (such as signal gain, S/N, noise figure, isolation, and acoustic signal level) that indicate the performance of elements or circuits. Unlike electrical units such as voltage (V), current (A), resistance (Ω), power (W), this unit expresses ratios such as voltage to voltage, current to current, and power to power in terms of logarithms. Since values expressed in dB take the logarithms of antilogarithms, such expression is equivalent to compressing large numbers and expanding small numbers. As a result, even extremely large values (antilogarithms) can be expressed by numbers (dB) having few digits. Expressing electrical characteristics by dB has many advantages when dealing with signals in electronic circuits.

Examples of control by dB are numerous, and include, in particular, digital control by dB of signal levels used in analog wireless and cable communication apparatus, volume control in acoustic devices, and in signals used in, for example, devices for amusement (such as sound effects in games).

In a multiplier that operates to the sixth decimal bit with D as the input signal (data) and decibel multiplier M as the multiplier (in the direction of decrease), if the decibel multiplier M is represented as:

$$M=0.A1A2A3A4A5A6 \; (A1–A6 \text{ being 1 or 0})$$

then, in decimal notation:

$$m=A1/2+A2/4+A3/8+A4/16+A5/32+A6/64$$

The multiplication is actually D×each bit of M, and the circuit therefore has a construction such as shown in FIG. 1. The input data are multiplied by the value of the A1 bit at multiplier 311. The result is added at adder 321 to a value obtained by multiplying, at multiplier 312, the value of the A2 bit by input data D that have been shifted one bit to the left one-bit shift circuit 301.

The value of input-data D that have been shifted another bit to the left by bit shift circuit 302 is multiplied by the value of the A3 bit at multiplier 313, and this result is added to the addition result of adder 321 at adder 322. The same calculation is then carried out by one-bit shift circuit 303, multiplier 314, adder circuit 323, one-bit shift circuit 304, multiplier 315, adder circuit 324, one-bit shift circuit 305, multiplier 316, and adder circuit 325.

FIG. 2 shows a multiplier of a shift addition system, which is another example of the prior art. Input data are bit-shifted by n-bit shift register 401, synchronized with a clock and outputted, and then logically ANDed with the output of multiplier circuit 402 to at AND circuit 403. A multiplication operation is then performed by adding this result to the content of D-type flip-flop 405 at adder circuit 404. In this case, one adder is used to carry out the addition operation because data to be shifted next are added to the addition operation results that were previously shifted (stored in D flip-flop 405).

In the first example of the prior art, the calculation results are found by adding the results of multiplying input data D that have been shifted n bits by each of the M bits. This construction requires five adders and five bit-shift circuits for performing the process of shifting input data D one bit at a time. As a consequence, the operation is time-consuming, the circuit configuration is complex, and the circuit scale is large.

The other example of the prior art, which is a multiplier circuit of a shift addition system that is typical in the prior art, has a simple configuration. This example, however, employs a shift register and therefore requires the supply of clocks from the outside and further, requires a number of blocks of processing time equal to the number of numerical digits of the multiplier before output results can be obtained.

SUMMARY OF THE INVENTION

It is an object of the present invention to provide a decibel level adjustment device that features a simple configuration, a smaller circuit scale, and shorter processing time, and moreover, that can dynamically designate the calculation range.

The present invention is a decibel level adjustment device that is used at points where processing for digitally adjusting the level of signal amplitude is performed in a circuit that adjusts the amplitude of a signal, such as in a wireless apparatus. The present invention performs a level adjustment operation for received signals with decibels as units in accordance with a decibel control value.

In contrast with a decibel calculation circuit of the prior art that uses ordinary multiplier circuits, the decibel level adjustment device of this invention has a construction that produces a plurality of signals in which the bit width of the amplitude level of an input signal is expanded according to a received decibel control value and that produces the target signal level by adding these generated signals together.

Accordingly, this decibel level adjustment device can easily convert a signal for which amplitude adjustment is desired to output of any level by applying a decibel control value (dB). In addition, the output result can be obtained at higher speed because the number of operations is reduced.

Considering the principles of multiplication in a bit sequence, an original number is multiplied by 1/(2 to the nth power) each time the original number is shifted one bit to the right, and multiplied by 2 to the nth power when shifted one bit to the left. It is a well-known fact that any level can be produced by adding combinations of these multiples. The present invention provides a, device capable of easy decibel operation by focusing on these rules and the units of dB.

For example, 1 dB is approximately 1.12202 times the input signal and therefore can be represented by the result of adding 0-bit shift+3-bit right shift. The symbol "(2)" below indicates that a figure is in binary notation. In effect, 1 dB≈1.12202 (antilogarithm)=1.001000 (2)=1.0+0.125.

Since 2 dB is approximately 1.25893 times the input signal, it can be represented by the result of adding: 0-bit shift+2-bit right shift+6-bit right shift.

Similarly, 2 dB≈1.25893 (antilogarithm)=1.010001 [(2)]= 1.0+0.25+0.01563. The values for 3, 4, and 5 dB can be found in the same way. Furthermore, −1 dB, −2 dB can also be calculated in the same way. For example, −1 is approximately 0.89125 times the input signal and therefore can be represented by the result of adding: 1-bit right shift+2-bit right shift+3-bit right shift +6-bit right shift.

Thus, −1 dB≈0.89125 (antilogarithm)=0.5+0.25+0.125+ 0.01563.

Based on these relationships, Table 2 shows values for control values in 1-dB units from −18 dB to +17 dB.

In the present invention, the means for shifting input data perform simultaneous processing in parallel. In addition, the means for shifting input data are not of a construction that uses shift registers and are therefore capable of high-speed operation. Moreover, the adders are capable of completing an operation in one processing unit and the processing time is therefore minimal.

In actuality, the time taken for an operation also depends on the calculation accuracy, but, as an example, even if the amount of bit-shifting for the 0–5 dB calculation group is set at as many as 6 stages, the calculation requires no more than three adders. Since the first-stage adders can perform addition in parallel, the operation can be completed in the time of two addition operations (gate operation only), and the operation is therefore extremely fast.

In the present invention, furthermore, output of any broad range can be obtained by shifting the level of input signals in parallel and then adding a shift circuit at the output of these addition results.

Finally, since the shift circuits in the present invention do not use a large number of active elements, using instead only the arrangement of input data wiring and SW (barrel shifters), a simple construction, and therefore low power consumption can be realized and a circuit area requires no more than the area for principal wiring.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

First Embodiment

Figure 1:
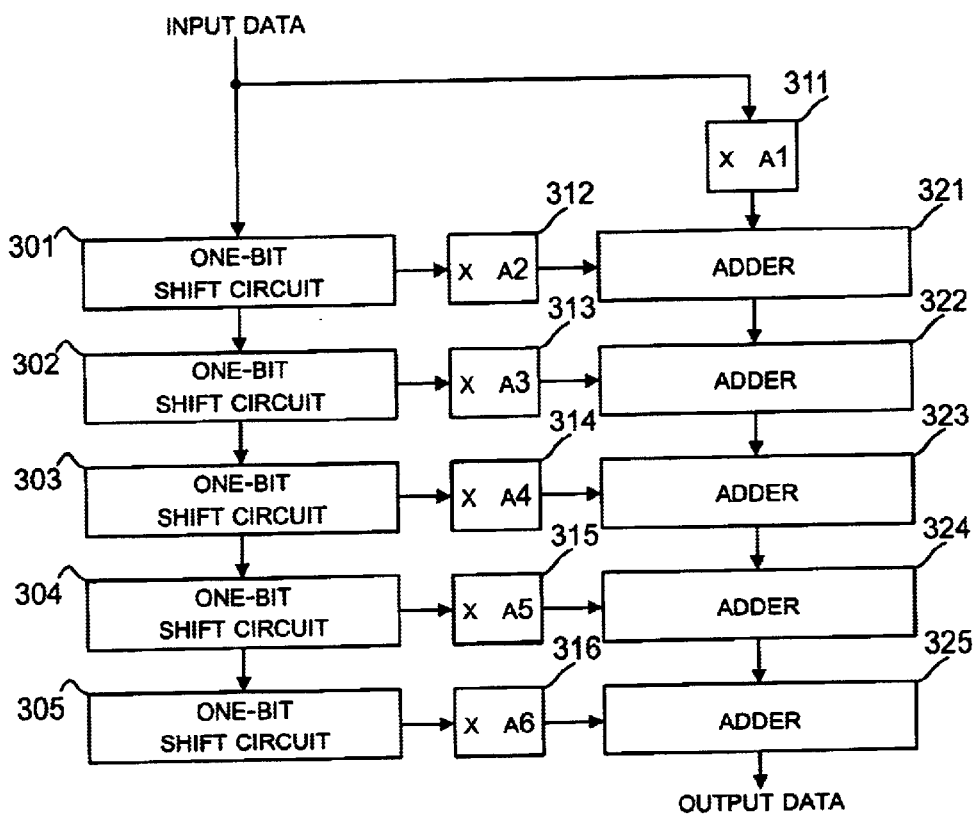
FIG. 1 shows the construction of multiplier of the prior art.
Figure 2:
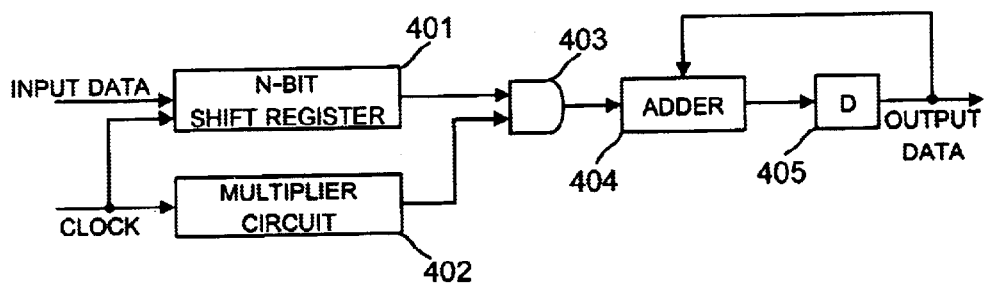
FIG. 2 shows the construction of a multiplier of a shift adder system.
Figure 3:
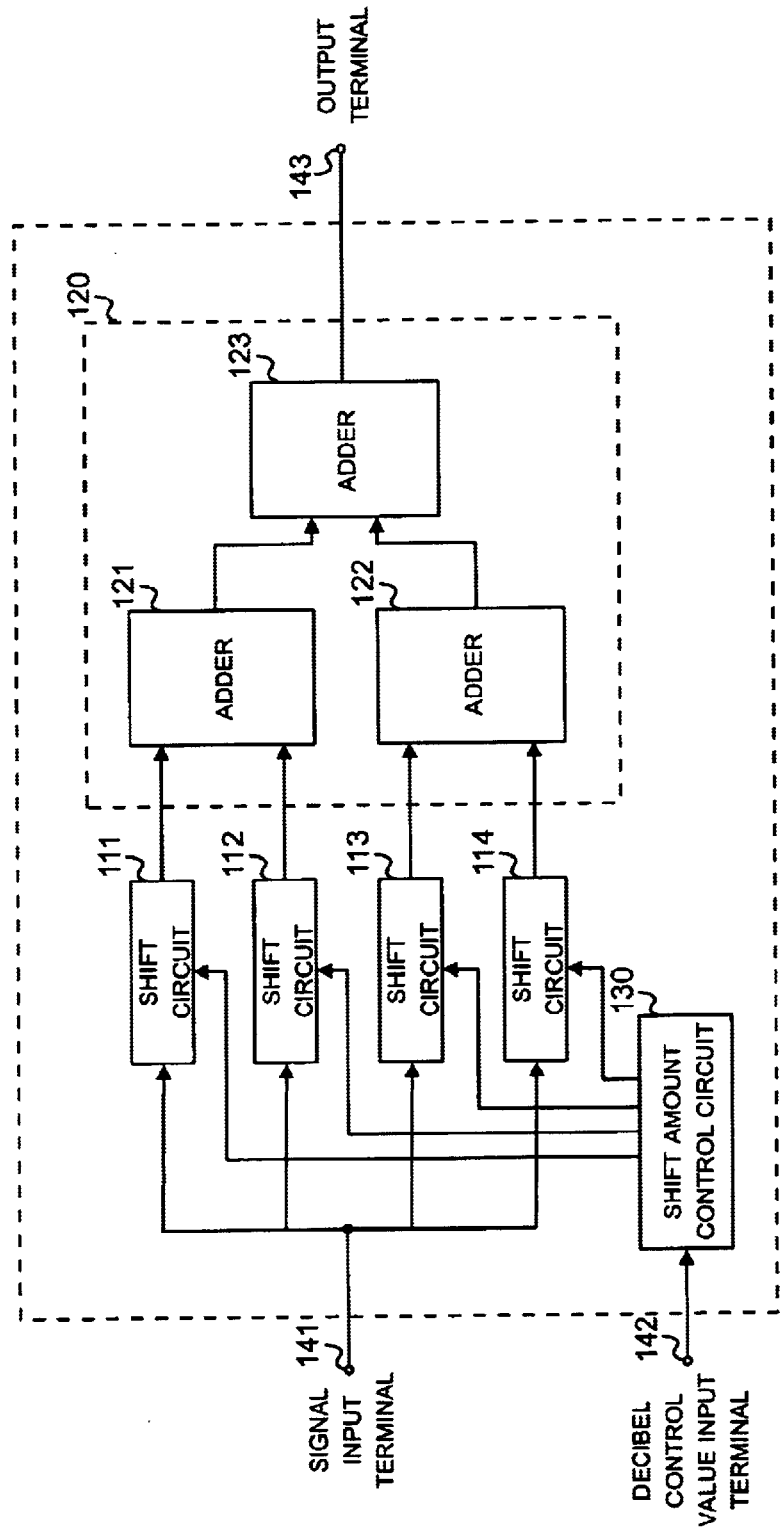
FIG. 3 is a structural view of a decibel level adjustment device according to the first embodiment of the present invention.

Referring now to FIG. 3, there is shown a decibel level adjustment device according to a first embodiment of the present invention, which comprises: shift circuits 111–114, adders 121 123, shift amount control circuit 130, signal input terminal 141, decibel control value input terminal 142, and output terminal 143.

A signal is supplied from signal input terminal 141. A case is shown in which decibel control values are supplied from decibel control value input terminal 142 in 1-dB steps over a control range of from −1 to −6 (dB). Shift amount control circuit 130 generates signals indicating the amount of shifting of each of shift circuits 111–114 in accordance with the received decibel control value. Shift circuits 111–114 shift the signal supplied from signal input terminal 141 a number of bits exactly equal to the shift amounts outputted from, shift amount control circuit 130, perform a process of aligning the bit columns (expand the bit width), and output the result. Adder 121 adds the addition values of shift circuits 111 and 112. Adder 122 adds the addition values of shift circuits 113 and 114. Adder 123 adds the addition values of adders 121 and 122 and outputs the result to output terminal 143.

The operation of the present invention will now be described.

Processing by shift amount control circuit 130 will first be explained. Table 1 shows how much the bit width of signal value in a particular input signal should be shifted when seeking a desired output signal according to a particular decibel control value. This table further clearly indicates which combination of each of the shifted signal lines should be added (cells where "1" is shown).

TABLE 1

| Decibel control value | Right shift amount antilogarithm | 1<br>0.5 | 2<br>0.25 | 3<br>0.125 | 4<br>0.0625 | 5<br>0.03125 | 6<br>0.015625 | Approximate dB value | dB error [dB] |
|---|---|---|---|---|---|---|---|---|---|
| −1 | 0.89125 | 1 | 1 | 1 | 0 | 0 | 1 | −1.01 | −0.01 |
| −2 | 0.79433 | 1 | 1 | 0 | 0 | 1 | 1 | −1.97 | 0.03 |
| −3 | 0.70795 | 1 | 0 | 1 | 1 | 0 | 1 | −3.06 | −0.06 |
| −4 | 0.63096 | 1 | 0 | 1 | 0 | 0 | 0 | −4.08 | −0.08 |
| −5 | 0.56234 | 1 | 0 | 0 | 1 | 0 | 0 | −5.00 | 0.00 |
| −6 | 0.56119 | 1 | 0 | 0 | 0 | 0 | 0 | −6.02 | −0.02 |

A case in which the decibel control value received at decibel control value input terminal 142 is "−2" will next be described.

When the decibel control value is "−2," shift amount control circuit 130 generates and outputs a control signal to shift circuit 111 that causes the signal value of the input signal to be shifted one bit to the right. At the same time, shift amount control circuit 130 generates and outputs control signals to shift circuit 112 to bring about shifting two bits to the right, to shift circuit 113 to bring about shifting five bits to the right, and to shift circuit 114 to bring about shifting six bits to the right. Shift amount control circuit 130 can easily generate shift amount control signals from the decibel control value by means of a combination of sequential circuits (such as gate logic). Moreover, this may be a configuration that employs memory wherein the decibel control values may be assigned to addresses and the memory output is used as the shift amount control signals.

Next, each of shift circuits 111–114 shifts the value of the bit width of a signal received from signal input terminal 141 in accordance with the shift control amounts supplied from shift amount control circuit 130. Since the decibel control value is "−2," shift circuit 111 generates a value that is ½ the input signal, the other shift circuits 112–114 each generate values that are ¼, 1/32, and 1/64 the value of the input signal, respectively, thereby expanding the bit width.

In the present embodiment, barrel shifters that bit-shift input signal values in accordance with shift amount control signals are employed as shift circuits 111–114. Barrel shifters are well known in the art, and details of their construction therefore will not be explained. It is known that the product of m×n bits is a bit width of (m+n), and the bit width must first be expanded before the add operation is performed. When the input signal is expressed as a binary number in this case, the input signal is typically treated as a complement expression of 2 if the input signal is a negative number. The complement of 2 is obtained by subtracting "1" the digits that are "1" or "0" when expressed in binary notation being made "0" if "1" and "1" if "0" In addition, the most significant bit of this number is taken as the sign, the number being positive if the most significant bit is "0" and negative if the most significant bit is "1".

Shift circuits 111–114 are shift circuits that perform the operations of: using the "1" or "0" of the most significant digit before expansion without alteration and adding "0" to positive numbers and "1" to negative numbers; expanding the bit width to a (m×n) bit width before performing the bit operation; and inserting "0" on the LSB side.

The output of each of shift circuits 111–114 that operate in parallel is then supplied to adder 120. Inside adder 120, the output of each of shift circuits 111–114 is supplied to adders 121 and 122 and thus immediately added. The result of this operation is then supplied to adder 123 to realize a sequential addition operation, and the result is outputted to output terminal 143. If there is surplus bit width at this time, the LSB side is discarded and the bit widths are uniformly outputted In other words, if the decibel control value is "−2" for the value of a signal that is received from signal input terminal 141:

output of output terminal 143=input signal/2+input signal/4+input signal/32+input signal/64≈input signal×0.79433 and the operation result corresponding to the decibel value is outputted.

In a case that does not use four shift circuits, such as for −4, −5, −6 dB in the decibel control values of Table 1, an appropriate operation result is obtained if the operation is performed by either controlling the shift amounts or resetting the shift circuits such that "0" is outputted as the output for all unnecessary shift circuits.

The present embodiment thus requires no more than three adders, as compared with a case in which the decibel calculation is performed with the multiplier expressed as far as six bits below the decimal point (when the multiplied decibel value is expressed as a binary number) or a case in which shift circuits carry out parallel processing and moreover, ordinary multiplier are used. The present embodiment therefore allows a simplification of the circuit configuration. In addition, in a case of using a shift register-type multiplier, the present embodiment entails only the delay time of the gates (which is essentially the processing time of adders and the carry time), and output results can therefore be obtained in real time.

Moreover, as can be seen from the dB error in Table 1, the present embodiment allows error to be suppressed to a few hundredths of a dB.

Furthermore, making the decibel control value of shift amount control circuit 130 a control signal and generating an arbitrary shift amount control signal enables not only decibel operations, but any operation to be performed.

For example, a method is also possible that decreases the number of adders and increases the operation speed by using a combination of 1-, 3-, 4-, and 6-bit shifts of the input signal for making the output signal level ½ the input signal level, or a combination of 1-, 4-, and 6-bit shifts of the input signal for making the output signal level the root of ⅓ the input signal level.

Second Embodiment

Figure 4:
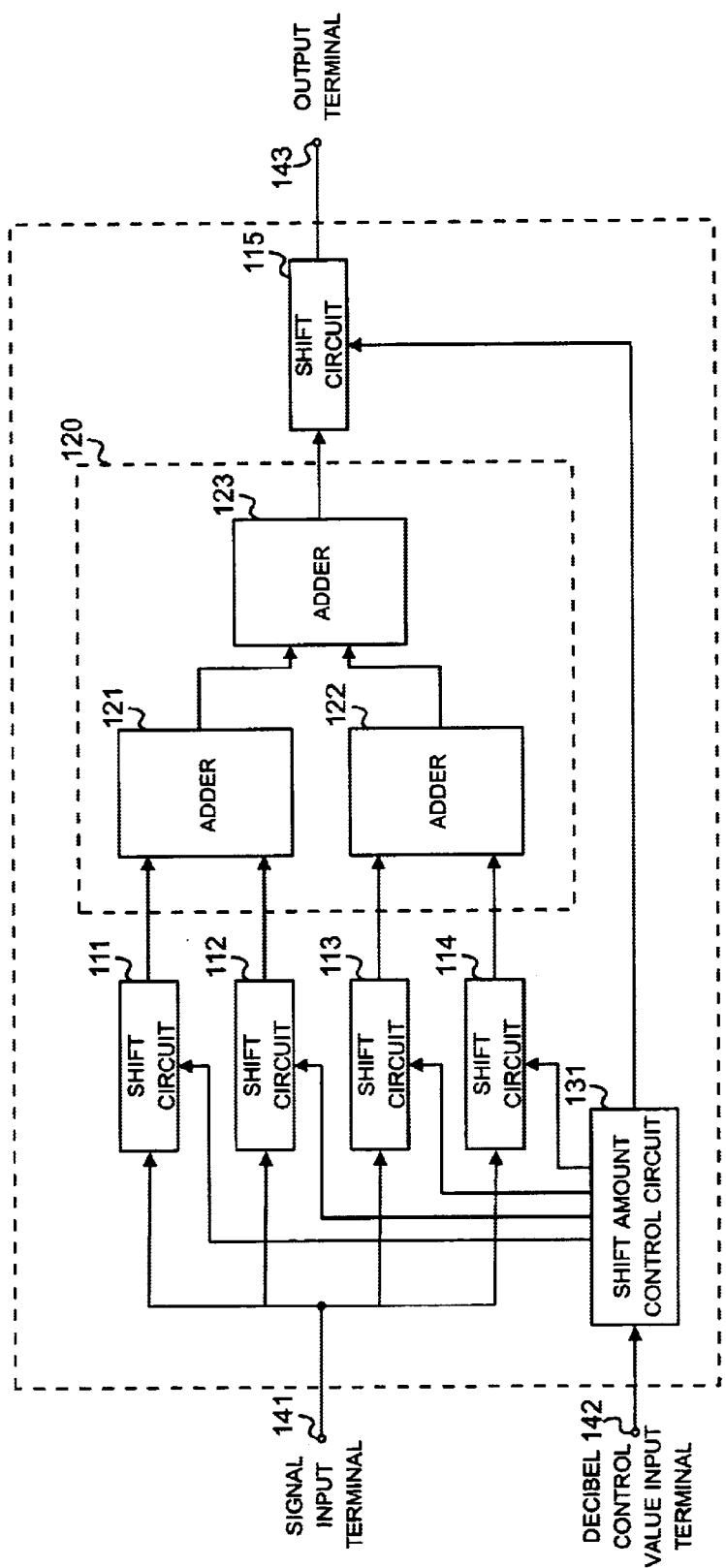
FIG. 4 is a structural view showing a decibel level adjustment device according to the second embodiment of the present invention.

Referring now to FIG. 4, there is shown a decibel level adjustment device according to a second embodiment of the present invention which differs from the first embodiment of FIG. 3 in that shift circuit 115 is added between adder 120 and output terminal 143 and shift amount control circuit 131 has been provided in place of shift amount control circuit 130 to allow control of the shift amount of shift circuit 115.

This embodiment has the effect of broadening the range of levels of input signals that can be adjusted. For example, a range of decibel level control values is shown in Table 2, and a case in which the range is from +17 to −18 dB will be explained.

TABLE 2

| Decibel control value | Right shift amount antilogarithm | −2 4 | −1 2 | 0 1 | 1 0.5 | 2 0.25 | 3 0.125 | 4 0.0625 | 5 0.03125 | 6 0.015625 | 7 0.0078125 | 8 0.00390625 | Approximate dB value | dB error [dB] |
|---|---|---|---|---|---|---|---|---|---|---|---|---|---|---|
| 17 | 7.07946 | 1 | 1 | 1 | 0 | 0 | 1 | 0 | 0 | 0 | 0 | 0 | 17.06 | 0.06 |
| 16 | 6.30957 | 1 | 1 | 0 | 0 | 1 | 1 | 0 | 0 | 0 | 0 | 0 | 16.09 | 0.09 |
| 15 | 5.62341 | 1 | 0 | 1 | 1 | 0 | 1 | 0 | 0 | 0 | 0 | 0 | 15.00 | 0.00 |
| 14 | 5.01187 | 1 | 0 | 1 | 0 | 0 | 0 | 0 | 0 | 0 | 0 | 0 | 13.98 | −0.02 |
| 13 | 4.46684 | 1 | 0 | 0 | 1 | 0 | 0 | 0 | 0 | 0 | 0 | 0 | 13.06 | 0.06 |
| 12 | 3.98107 | 1 | 0 | 0 | 0 | 0 | 0 | 0 | 0 | 0 | 0 | 0 | 12.04 | 0.04 |
| 11 | 3.54813 | 0 | 1 | 1 | 1 | 0 | 0 | 1 | 0 | 0 | 0 | 0 | 11.04 | 0.04 |
| 10 | 3.16228 | 0 | 1 | 1 | 0 | 0 | 1 | 1 | 0 | 0 | 0 | 0 | 10.07 | 0.07 |
| 9 | 2.81838 | 0 | 1 | 0 | 1 | 1 | 0 | 1 | 0 | 0 | 0 | 0 | 8.98 | −0.02 |
| 8 | 2.51189 | 0 | 1 | 0 | 1 | 0 | 0 | 0 | 0 | 0 | 0 | 0 | 7.96 | −0.04 |
| 7 | 2.23872 | 0 | 1 | 0 | 0 | 1 | 0 | 0 | 0 | 0 | 0 | 0 | 7.04 | 0.04 |
| 6 | 1.99526 | 0 | 1 | 0 | 0 | 0 | 0 | 0 | 0 | 0 | 0 | 0 | 6.02 | 0.02 |
| 5 | 1.77828 | 0 | 0 | 1 | 1 | 1 | 0 | 0 | 1 | 0 | 0 | 0 | 5.01 | 0.01 |

TABLE 2-continued

| Decibel control value | Right shift amount antilogarithm | -2 4 | -1 2 | 0 1 | 1 0.5 | 2 0.25 | 3 0.125 | 4 0.0625 | 5 0.03125 | 6 0.015625 | 7 0.0078125 | 8 0.00390625 | Approximate dB value | dB error [dB] |
|---|---|---|---|---|---|---|---|---|---|---|---|---|---|---|
| 4 | 1.58489 | 0 | 0 | 1 | 1 | 0 | 0 | 1 | 1 | 0 | 0 | 0 | 4.05 | 0.05 |
| 3 | 1.41254 | 0 | 0 | 1 | 0 | 1 | 1 | 0 | 1 | 0 | 0 | 0 | 2.96 | -0.04 |
| 2 | 1.25893 | 0 | 0 | 1 | 0 | 1 | 0 | 0 | 0 | 0 | 0 | 0 | 1.94 | -0.06 |
| 1 | 1.12202 | 0 | 0 | 1 | 0 | 0 | 1 | 0 | 0 | 0 | 0 | 0 | 1.02 | 0.02 |
| 0 | 1.00000 | 0 | 0 | 1 | 0 | 0 | 0 | 0 | 0 | 0 | 0 | 0 | 0.00 | 0.00 |
| -1 | 0.89125 | 0 | 0 | 0 | 1 | 1 | 1 | 0 | 0 | 1 | 0 | 0 | -1.01 | -0.01 |
| -2 | 0.79433 | 0 | 0 | 0 | 1 | 1 | 0 | 0 | 1 | 1 | 0 | 0 | -1.97 | 0.03 |
| -3 | 0.70795 | 0 | 0 | 0 | 1 | 0 | 1 | 1 | 0 | 1 | 0 | 0 | -3.06 | -0.06 |
| -4 | 0.63096 | 0 | 0 | 0 | 1 | 0 | 1 | 0 | 0 | 0 | 0 | 0 | -4.08 | -0.08 |
| -5 | 0.56234 | 0 | 0 | 0 | 1 | 0 | 0 | 1 | 0 | 0 | 0 | 0 | -5.00 | 0.00 |
| -6 | 0.56119 | 0 | 0 | 0 | 1 | 0 | 0 | 0 | 0 | 0 | 0 | 0 | -6.02 | -0.02 |
| -7 | 0.44668 | 0 | 0 | 0 | 0 | 1 | 1 | 1 | 0 | 0 | 1 | 0 | -7.03 | -0.03 |
| -8 | 0.39811 | 0 | 0 | 0 | 0 | 1 | 1 | 0 | 0 | 1 | 1 | 0 | -7.99 | 0.01 |
| -9 | 0.35481 | 0 | 0 | 0 | 0 | 1 | 0 | 1 | 1 | 0 | 1 | 0 | -9.08 | -0.08 |
| -10 | 0.31623 | 0 | 0 | 0 | 0 | 1 | 0 | 1 | 0 | 0 | 0 | 0 | -10.10 | -0.10 |
| -11 | 0.28184 | 0 | 0 | 0 | 0 | 1 | 0 | 0 | 1 | 0 | 0 | 0 | -11.02 | -0.02 |
| -12 | 0.25119 | 0 | 0 | 0 | 0 | 1 | 0 | 0 | 0 | 0 | 0 | 0 | -12.04 | -0.04 |
| -13 | 0.22387 | 0 | 0 | 0 | 0 | 0 | 1 | 1 | 1 | 0 | 0 | 1 | -13.05 | -0.05 |
| -14 | 0.19953 | 0 | 0 | 0 | 0 | 0 | 1 | 1 | 0 | 0 | 1 | 1 | -14.01 | -0.01 |
| -15 | 0.17783 | 0 | 0 | 0 | 0 | 0 | 1 | 0 | 1 | 1 | 0 | 1 | -15.10 | -0.10 |
| -16 | 0.15849 | 0 | 0 | 0 | 0 | 0 | 1 | 0 | 1 | 0 | 0 | 0 | -16.12 | -0.12 |
| -17 | 0.14125 | 0 | 0 | 0 | 0 | 0 | 1 | 0 | 0 | 1 | 0 | 0 | -17.04 | -0.04 |
| -18 | 0.12589 | 0 | 0 | 0 | 0 | 0 | 1 | 0 | 0 | 0 | 0 | 0 | -18.06 | -0.06 |

Decibels are a logarithmic function, and moreover, based on the relationship of the bit shifting of the data, a regularity can be seen between dB and the antilogarithms. In Table 2, it can be seen that the each of the amounts of shifting in the range from -1 to -6 dB are repeated with the same pattern in the ranges from -7 to -12 dB and from -13 to -18 dB, this pattern being bit-shifted as a whole to the right. The use of these patterns allows an easy expansion of the decibel control range. Further, each of the shift amounts in the ranges from 0 to 5 dB, from 6 to 11 dB, and from 12 to 17 dB on the positive side are obtained by bit-shifting to the left and also exhibit the same pattern as the shift amounts in the range from -1 to -6 dB.

Level control over a broad range is thus realized by adding this shift circuit 115 and performing bit-shift control over the output of adder 123.

Further, as a variant of the second embodiment, since it can be seen that values are always shifted one bit to the right within the pattern from -1 to -6 dB realized by this construction, shift circuit 111 can be eliminated, values can be generated in advance in which the bit width of the input signal has been expanded, and the signal can be connected directly to adder 121. In this case, the same effect can be obtained if control is performed such that, for example, shift circuits 112, 113, and 114 reduce the amount of shifting by 1 at a time and the output results are shifted one bit to the left. In such a case, one shift circuit can be eliminated.

Third Embodiment

Although the first and second embodiments described hereinabove presented cases in which shift circuits were used that employed, for example, barrel shifters that can control shift amounts, a similar effect can be obtained by wiring alone without using shift circuits.

Figure 5:
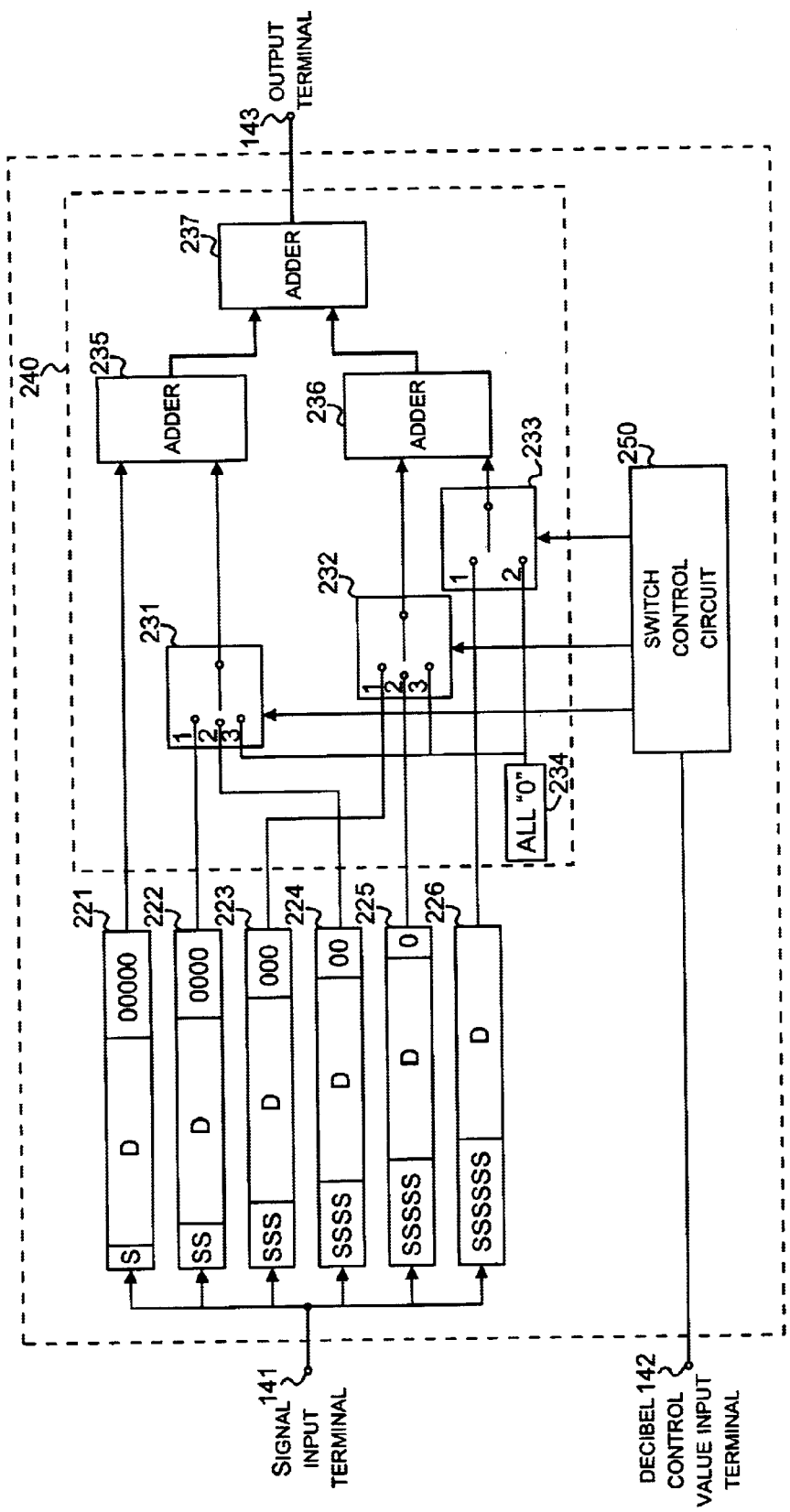
FIG. 5 is a structural view showing a decibel level adjustment device according to the third embodiment of the present invention.
Figure 6A:
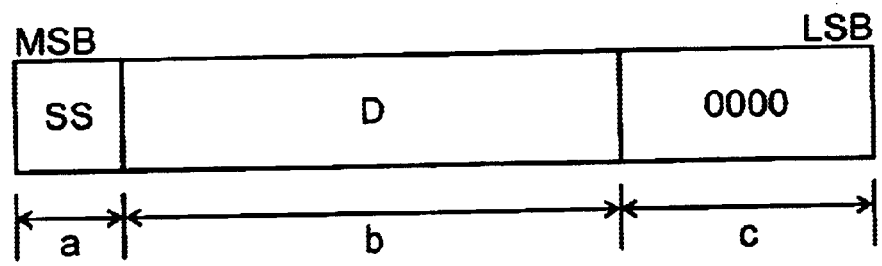
FIG. 6 is an explanatory view of wiring 222 in FIG. 5.
Figure 6B:
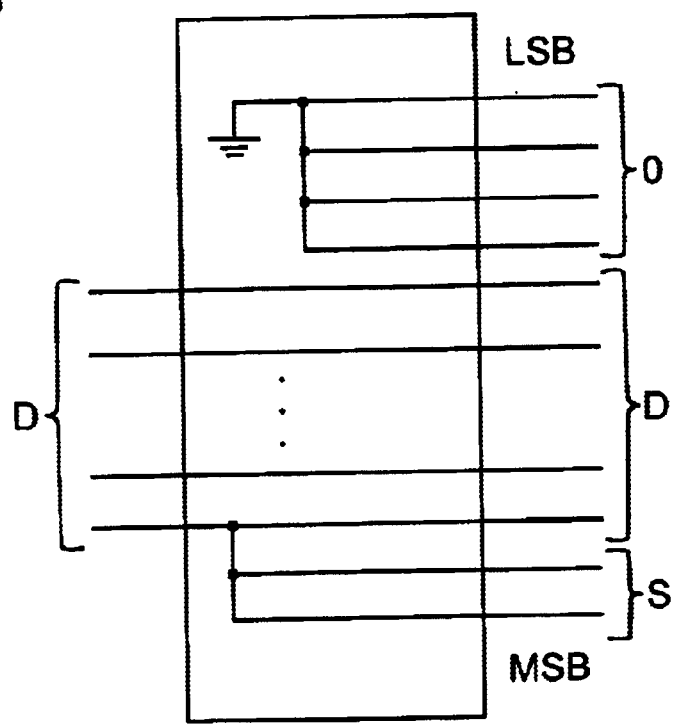

FIG. 5 shows a construction for this purpose as the third embodiment. In contrast to the first embodiment, which employed shift circuits that allow control of shift amounts from the outside, in this embodiment, signals that have been expanded to the bit width required for an operation are produced from an input signal by only combinations of wiring. For example, signal line 222, which is expanded based on a signal received from input terminal 141 in FIG. 5, has the construction shown in FIG. 6A. In the example shown in FIG. 6A, "SS" in block "a" on the MSB side is a 2-bit sign code, and "0000" of block c on the LSB side is a pad for aligning bit width when carrying out an operation. In effect, this portion expands the bit width. Block "b" is the bit width of the received data. The expansion of this bit width is realized simply by the wiring alone, as shown in FIG. 6B. The same is true for wiring 221 and 223–226.

Further, to decrease the number of adders, switches 231–233 are provided to enable selection, from any six bit-expanded signals, only those signals that are necessary for converting to the target signal level.

As in the first embodiment, this example also illustrates a case in which the decibel control values shown in Table 1 range from -1 to -6 dB. Switch control circuit 250 generates switch control signals that control switches 231–233 for applying each of the input signals that have been expanded by bit-shifting exactly the target shift amount to adders 235 and 236. As an example, it is desired that the result of a decibel calculation, in which the amplitude level of a signal received from input terminal 141 is multiplied by -3 dB, be outputted to output terminal 143. Since this result is a valuer obtained by adding the values obtained by 1-bit shift +3-bit shift +4-bit shift +6-bit shift, switch control circuit 250 should output switch control signals such that the input side of switch 231 is connected to the contact 2 side, the input side of switch 232 is connected to the contact 1 side, and the input side of switch 233 is connected to the contact 1 side.

Regarding the operation for a case in which the value of a decibel control value that is received from the contacts and decibel control value input terminal 142 is −5 dB, the input signal is subjected to only 1-bit shift +4-bit shift, and switch control circuit 250 should therefore output switch control signals such that switch 231 connects to the contact 2 side, switch 232 connects to the contact 3 side, and switch 233 connects to the contact 2 side. At this time, a value of all "0" that is generated at all- "0" generation circuit 234 is applied to adder 236, whereby all "0" is outputted to this output and applied to adder 237. As a result, the target operation can be performed and the result outputted from output terminal 143. Since switch control circuit 250 is adequate if it can generate any switch control signal from a decibel control value, switch control circuit 250 may be constructed from ordinary components such as selectors or components using logic circuits (a combination of gate logic) or memory.

Inserting a barrel shifter between adder 237 and output terminal 143 of this embodiment and performing control to shift output signals that are outputted from adder 237 in accordance with a decibel control value enables the performance of level adjustment over a broader range.

Finally, although decibel control was performed in steps of 1 dB in the explanation of the above-described embodiments, control may be performed in steps of 0.5 dB, 1.5 dB or 2 dB if the construction produces appropriate signals as control signals and the number of bits of shift amount.

While preferred embodiments of the present invention have been described using specific terms, such description is for illustrative purposes only, and it is to be understood that changes and variations may be made without departing from the spirit or scope of the following claims.

What is claimed is:

1. A decibel level adjustment device for calculating an output signal which is a d decibel multiple of an input signal, comprising:

a plurality of shift means arranged parallel to each other for shifting said input signal exactly a designated number of bits in a designated direction;

a shift amount control circuit means for receiving the value of said d as a decibel control value and, in accordance with said decibel control value, for generating and outputting a control signal indicating the direction and number of bits of shifting of each of said shift means; and adder means for adding the outputs of said shift circuits together.

2. A device according to claim 1, further comprising an additional shift means for shifting the output of said addition means exactly a designated number of bits in a designated direction;

wherein said shift amount control circuit means generates and outputs a control signal indicating the shift direction and number of bits of shifting of said additional shift means.

3. A device according to claim 2, wherein said shift means is a barrel shifter.

4. A device according to claim 1, wherein said shift means is a barrel shifter.

* * * * *